United States Patent [19]
Atkinson et al.

[11] Patent Number: 5,818,452
[45] Date of Patent: Oct. 6, 1998

[54] SYSTEM AND METHOD FOR DEFORMING OBJECTS USING DELTA FREE-FORM DEFORMATION

[75] Inventors: James R. Atkinson, Santa Barbara; Barbara M. Balents, Goleta, both of Calif.

[73] Assignee: Silicon Graphics Incorporated, Mountain View, Calif.

[21] Appl. No.: 512,136

[22] Filed: Aug. 7, 1995

[51] Int. Cl.$^6$ .................................................. G06T 17/40
[52] U.S. Cl. ......................... 345/420; 345/433; 345/441
[58] Field of Search ........................... 345/418–19, 420, 345/440–43, 433–39; 364/468.03, 468.04, 468.08, 468.09, 468.1, 578

[56] References Cited

U.S. PATENT DOCUMENTS

| | | | |
|---|---|---|---|
| 5,121,334 | 6/1992 | Riley et al. | 345/419 |
| 5,412,770 | 5/1995 | Yamashita et al. | 345/442 |
| 5,481,659 | 1/1996 | Nosaka et al. | 345/123 |
| 5,557,719 | 9/1996 | Ooaka et al. | 345/441 |
| 5,561,754 | 10/1996 | Oliver et al. | 345/441 |
| 5,579,464 | 11/1996 | Saito et al. | 345/441 |
| 5,594,853 | 1/1997 | Salesin et al. | 345/441 |
| 5,619,625 | 4/1997 | Konno et al. | 354/419 |
| 5,712,964 | 1/1998 | Kamada et al. | 345/418 |

OTHER PUBLICATIONS

Gourret, et al. "Modeling of Contact Deformations Between a Synthetic Human and Its Environment", *Computer Aided Design*, vol. 23, No. 7, pp. 514–520, Sep. 1991.

Wu, et al, "Deformable Surfaces using Physically Based Particles", *Computer Graphics: Developments in Virtual Environments, Computer Graphics International*, pp. 205–215, 1995.

Gourret, et al, "Simulation of Object and Human Skin Deformations in a Grasping Task", *Computer Graphics, Siggraph '89*, pp. 21–30, Aug. 1989.

Magnenat–Thalmann, et al, "Joint–Dependent Local Deformations for Hand Animation and Object Grasping", *Graphics Interface '88*, pp. 26–33, 1988.

Bardinet, Eric, et al, "Tracking Medical 3D Data with a Parametric Deformable Model", *Computer Vision, 1995 International Conference, IEEE*, Apr. 1995, pp. 299–302.

Adachi, Yoshitaka, et al, "Touc and Trace on the Free–Form Surface of a Virtual Object", *Virtual Reality, IEEE, 1993 Intenational Symposium*, 1993, pp. 162–168.

Iwata, Hiroo, "Pen–Based Haptic Virtual Environment", *Virtual Reality, IEEE, 1993 International Symposium*, 1993, pp. 287–292.

Yamashita, Juli, et al, "A Direct Deformation Model", *Virtual Reality, IEEE, 1993 Intenational Symposium*, 1993, pp. 499–504.

Lizhuang, Ma, et al, "Advanced Curve and Surface Design in CAD System Using STEP", *TENCON '93, IEEE Region 10 Conference on Computer Communication*, 1993, pp. 581–583.

Lamousin, Henery J., et al, "NURBS–Based Free–Form Deformations", *IEEE Computer Graphics and Applications Magazine*, vol. 14, No. 6, Nov. 1994, pp. 59–65.

True, Thomas J., et al, "Volume Warping", *Visualization, 1992 Conference, IEEE*, 1992, pp. 308–315.

(List continued on next page.)

*Primary Examiner*—Rudolph J. Buchel, Jr.
*Attorney, Agent, or Firm*—Sterne, Kessler, Goldstein, & Fox P.L.L.C.

[57] ABSTRACT

A system and method for deforming objects uses delta free-form deformations (DFFD). The DFFD computes a delta vector based on a conventional free-form deformation (FFD) and an original vertex. Multiple delta vectors can be computed and combined for each vertex. Because delta vectors are independent from each other, various operations such as rotations and translations in addition to multiple overlapping deformations are applied to the vertex with superior results over the conventional FFD.

29 Claims, 8 Drawing Sheets

OTHER PUBLICATIONS

Fujimoto, Hideo, et al, "Development of CAPP System for Removal Operation of 3D Free Surfaces", *Industrial Electronics, IEEE, 1992 International Symposium*, pp. 404–408.

Johnson, Stephen P.; McReynolds, Tom, "Implementing curves in C++: computer graphics benefit from class libraries", *Dr. Dobb's Journal*, v17, n12, pS53(11), Dec. 1992.

Owen, J. and A.P. Rockwood, "Intersection of General Implicit Surfaces", *Geometric Modeling: Algorithms and New Trends*, G. Farin editor, SIAM, 1986, pp. 335–345.

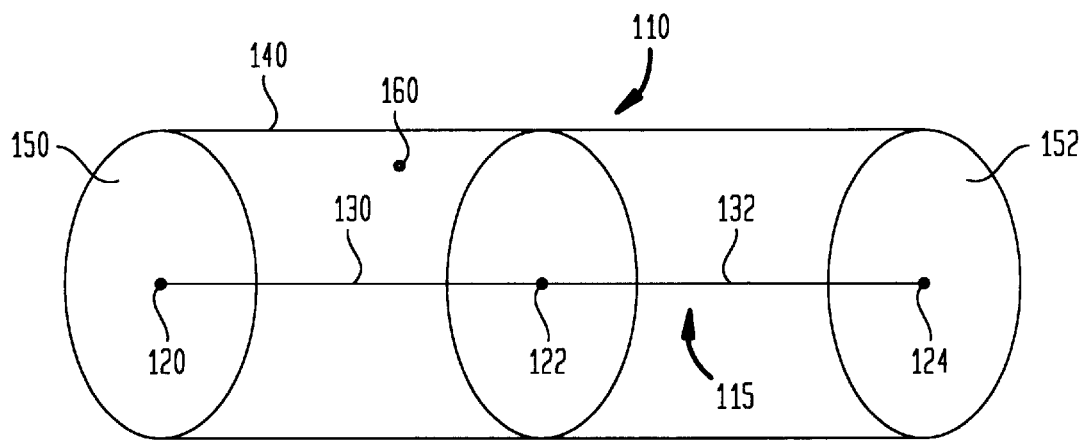
FIG. 1
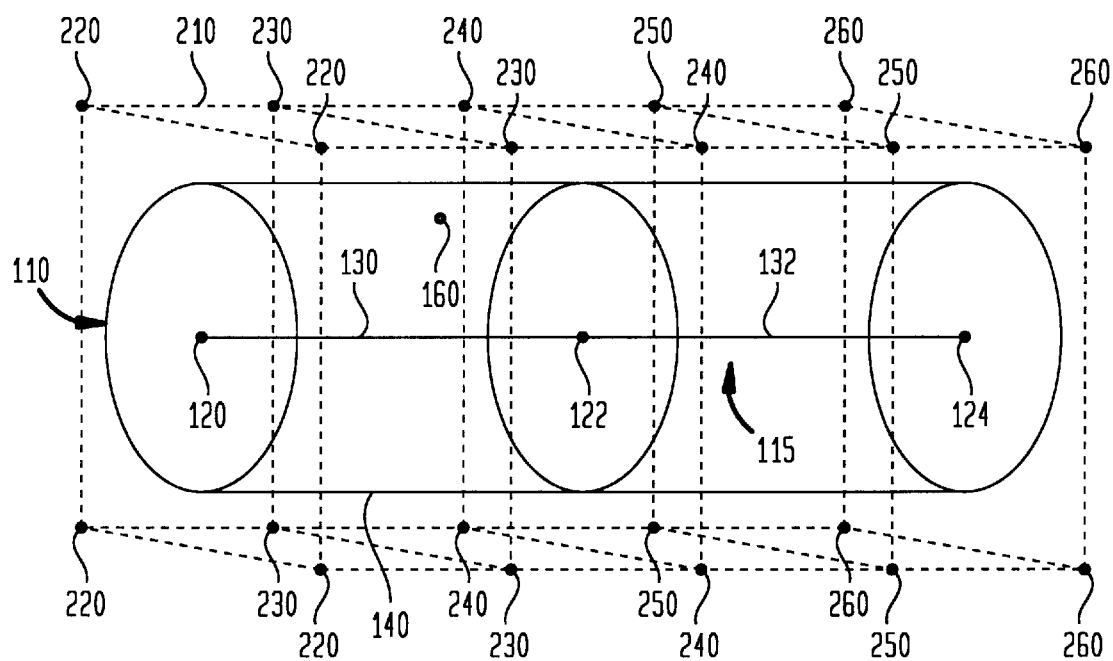
FIG. 2
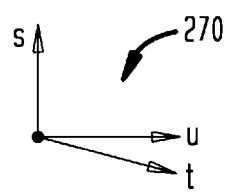

SYSTEM AND METHOD FOR DEFORMING OBJECTS USING DELTA FREE-FORM DEFORMATION

RELATED APPLICATION

This application is related to a commonly owned application, filed concurrently herewith entitled "Volume-Based Free-Form Deformation Weighting" and having U.S. patent application Ser. No. 08/511,660 which is incorporated herein by reference.

BACKGROUND OF THE INVENTION

1. Field of the Invention

The present invention relates generally to computer graphics and more specifically, to deforming objects using free-form deformation.

2. Related Art

A graphic program for character animation allows a user to create a three dimensional (3D) geometric model of a character, place a skeleton inside the model, and animate the character by animating the skeleton. The three dimensional model forms a skin for the skeleton. Each point, or vertex, on the skin is attached to a particular bone, or segment, of the skeleton. When the particular segment moves during animation, the vertex attached to the particular segment moves with it. This is accomplished through an operation referred to as a segment transformation. Unfortunately, this type of animation does not produce smooth bends at the joints of the segment. Neither does this type of animation account for effects such as muscles bulging. These effects, i.e., smooth bends at joints and bulging muscles, require some type of free-form deformation.

Free-form deformation is an important tool in computer-assisted design and animation. Free-form deformation has been used to implement effects such as smooth bends at joints and bulging muscles. Free-form deformation uses a grid comprised of control points which is imposed on an object. A user displaces one or more of the control points to "deform" the object in a region of the grid.

Free-form deformation is similar to a sculptor pulling clay into a desired shaped. The sculptor pulls a particular point on the surface of the clay. The pulled point follows the sculptor's pull and deforms the clay. In addition, points on the surface of the clay near the pulled point also follow the sculptor's pull. Points closer to the pulled point are deformed to a greater extent than are points farther from the pulled point.

In terms of free-form deformation, a user displaces a control point on the grid. The displaced control point induces a deformation in the surface of the object in an area near the control point. Specifically, points, or vertices, defining the surface of the object are displaced or deformed in response to the displaced control point. Vertices closer to the control point are deformed to a greater extent than are vertices farther from the control point. The degree to which each vertex is deformed is determined based on trivariate Bernstein polynomials. A discussion of free-form deformation is found in Sederberg, T. W. and Parry, S. R., "Free-form Deformation of Solid Geometric Models," *Computer Graphics: Proceedings of SIGGRAPH* 86, vol. 20, no. 4, pp. 151–159 (August 1986), which is incorporated herein by reference. A further discussion of free-form deformation is found in U.S. Pat. No. 4,821,214 issued to Sederberg, T. W. on Apr. 11, 1989 which is also incorporated herein by reference.

Free-form deformation (FFD) has several problems associated with it. First, free-form deformation grids are presently not able to be overlapped. In other words, a vertex cannot be predictably controlled by multiple FFDs. For example, a first grid and a second grip overlap each other. A vertex lies in an overlap region of the first and second grids. An FFD from the first grid may displace the vertex outside of the second grid. The vertex would not be affected by an FFD from the second grid because the vertex is outside the range of the second grid. Users have dealt with this problem, though somewhat unsatisfactorily, by paying particular attention to an order in which the FFDs were applied. As a result, however, the order became vitally important for obtaining predictable results.

Furthermore, a small change to the first FFD may result in a disproportionately large change in the overall deformation. This is due to the fact that the vertex may be displaced by the first FFD into a region of the second FFD where the deformation is large.

Another problem is that an FFD and a segment transformation are incompatible operations. The segment transformation, in the character animation program, is performed by a series of matrix operations that relate the motion of a particular vertex to its attached segment, the attached segment to a joint, the joint to another segment, etc., eventually to a coordinate frame, such as world coordinates as is well-known in the art. Specifically, a single segment transformation matrix is determined that embodies a positional state of the segment relative to a known position.

In contrast, the FFD is a single transformation that receives a vertex and returns a deformed vertex. FFDs can not be reduced into a single transformation similar to that of the segment transformation. Nor can the FFD transformation be incorporated into the segment transformation matrix.

Thus, what is needed is a system and method to solve the problems associated with conventional free-form deformations.

SUMMARY OF THE INVENTION

The present invention is directed to an improved free-form deformation (FFD) that solves the problems associated with conventional FFDs. The present invention uses a delta free-form deformation (DFFD). The DFFD determines a delta vector as a result of a deformation to a vertex rather than determining coordinates for the deformed vertex. The delta vector represents the amount that the vertex would have moved under the conventional FFD.

A feature of the present invention is that the DFFD and a segment transformation are compatible operations. In other words, both operations can be performed on a given vertex. This allows the vertex to be controlled by both the DFFD and a segment. Thus, in terms of character animation, a skin of an object, such as an arm, can be modelled to exhibit effects, such as a muscle bulging, simultaneously with movement, such as an elbow bending.

Another feature of the present invention is that DFFDs are independent of one another. This feature allows grids associated with the DFFDs to overlap. As mentioned above, the result of each DFFD is a delta vector from the vertex being deformed. Multiple DFFDs may be performed on the same vertex with each resulting in an independent delta vector. The resulting independent delta vectors can be added together, in any order, to achieve an overall delta vector. The overall delta vector can be applied to the original vertex to determine the net effect of the multiple DFFDs.

Furthermore, the fact that DFFDs are independent from one another also eliminates the problem of having a small change in one deformation resulting in a disproportionately large change in an overall deformation. Because the independent delta vectors are added together, a small change in one independent delta vector results in a correspondingly small change in the overall delta vector.

A further feature of the present invention is that the delta vector can be subsequently scaled. This allows certain motions or effects to be amplified or attenuated without affecting other motions or effects.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 1 illustrates an exemplary object on which the present invention operates.

FIG. 2 illustrates the object shown in FIG. 1 in a grid of the present invention.

DETAILED DESCRIPTION OF THE EMBODIMENTS

Figure 3:
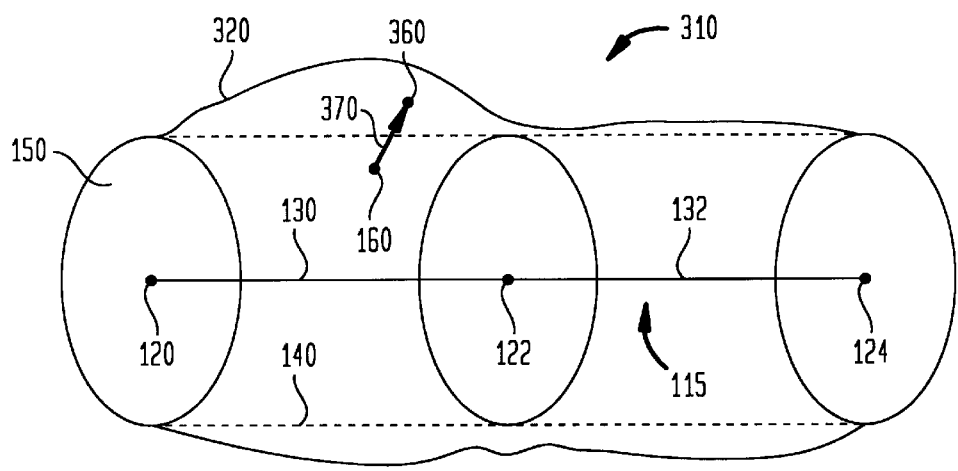
FIG. 3 illustrates the object shown in FIG. 2 after deformation according to a first embodiment of the present invention.

The present invention is described in terms of an exemplary environment. For purposes of this description, the exemplary environment is a character animation program that animates a particular object. After reading this description, it will become apparent to one skilled in the art how the present invention applies equally well in animating other objects. In addition, it will become apparent to one skilled in the art how the present invention applies to other computer graphics applications.

FIG. 1 illustrates an exemplary object on which the present invention operates. The exemplary object is an arm 110. Ann 110 comprises a skeleton 115. Skeleton 115 is used by the character animation program to animate arm 110.

Skeleton 115 is comprised of three joints: a shoulder joint 120, an elbow joint 122, and a wrist joint 124. Skeleton 115 is also comprised of two "bones" or segments: an upper arm segment 130 and a forearm segment 132.

Skeleton 115 is used to animate a character or object. In this case, arm 110 could be combined with other body components, i.e., hands, feet, legs, head, etc., to animate an entire character (not shown). However, for purposes of this discussion, arm 110 is sufficient to disclose the features and operation of the present invention.

In the character animation program, a skin 140 is wrapped around and attached to skeleton 115. Skin 140 is comprised of an exemplary vertex 160. In the preferred embodiment, vertex 160 is attached to a particular segment of skeleton 115. In this case, vertex 160 is attached to upper arm segment 130.

The character animation program animates skeleton 115, and hence, upper arm segment 130. Because vertex 160 is attached to upper arm segment 130, vertex 160 also becomes animated. In essence, the character animation program animates arm 110 by animating the underlying skeleton 115, and the attached skin 140 follows.

Unfortunately, the character animation program does not create a smooth bend in skin 140, for example, at elbow joint 122, or a bulging muscle in skin 140, for example, between shoulder joint 120 and elbow joint 122. These type of effects require free-form deformation.

Free-form deformation (FFD) is technique for deforming objects. FIG. 2 illustrates an object, such as arm 110, prior to undergoing a deformation. A grid 210 comprised of several control points (shown collectively as control points 220, 230, 240, 250, and 260) is laid over arm 110. A control point, such as one of control point 230, is displaced according to one of several methods well-known in the art. Displacing control point 230 induces a deformation in skin 140.

FFDs are well-known in the art. However, as discussed above, FFDs exhibit several problems especially when applied in character animation programs. The present invention, a delta free-form deformation (DFFD), solves the problems associated with FFDs.

Figure 7:
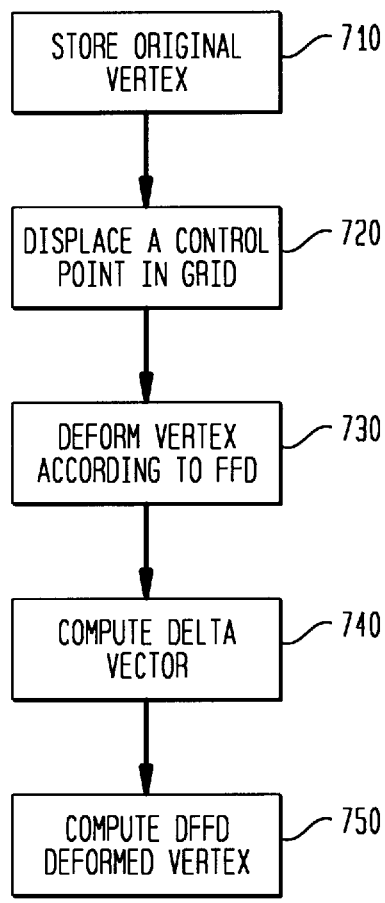
FIG. 7 illustrates a flow diagram of a first embodiment of the present invention.

The present invention is now described with reference to FIG. 2, FIG. 3, and FIG. 7. FIG. 2 is discussed above. FIG. 3 illustrates an object deformed according to a first embodiment of the present invention. FIG. 7 illustrates the steps of a method according to the first embodiment. All three figures will be used in the following discussion. Furthermore, an exemplary vertex 160 on skin 140 is used to describe the present invention.

In a step 710, an original location of vertex 160 is stored. In a step 720, a control point, for example, control point 230, is displaced. In a step 730, vertex 160 is deformed according to a conventional FFD. The conventional FFD returns a FFD deformed vertex 360.

In a step 740, a delta vector 370 is computed as the difference between FFD deformed vertex 360 and vertex 160. Delta vector 370 represents an amount FFD deformed vertex 360 is displaced from vertex 160 as a result of the FFD. In this embodiment, delta vector 370 represents the result of the DFFD operation.

In a step 750, a DFFD deformed vertex 360 is computed by adding delta vector 370 to vertex 160. As will be evident to one skilled in the art, DFFD deformed vertex 360 and FFD deformed vertex 360 are the same vertex. However, the FFD returns FFD deformed vertex 360 directly while the DFFD returns delta vector 370 which is subsequently added to vertex 160 to obtain DFFD deformed vertex 360. The importance of this difference will become apparent in reference to other embodiments of the present invention discussed below.

Applying the steps of FIG. 7 to each vertex on skin 140, results in deformed skin 320. In this way, arm 110 can be deformed to deformed arm 310 to add effects such as muscling as shown in FIG. 3.

Figure 4A:
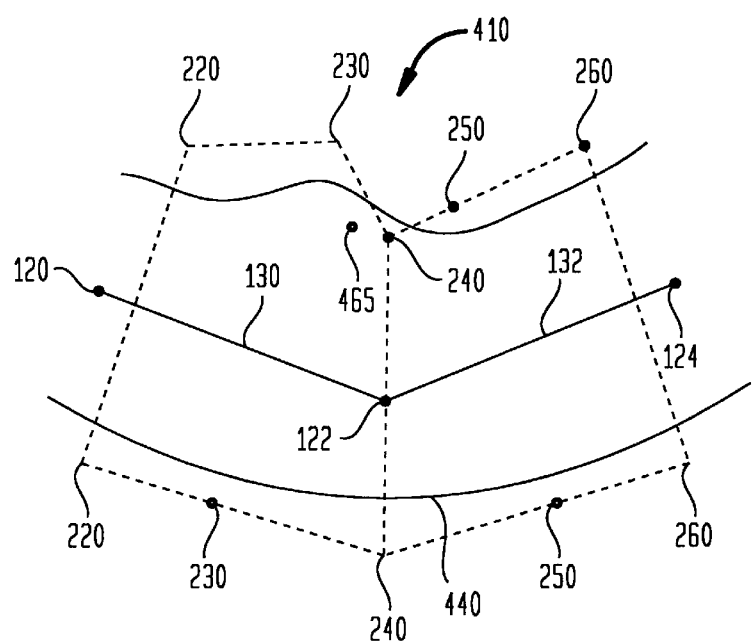
FIG. 4A illustrates the object shown in FIG. 2 after motion and deformation according to a second embodiment of the present invention.
Figure 4B:
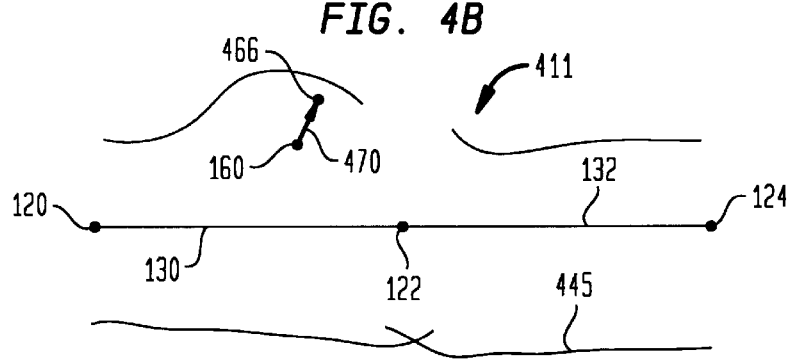
FIG. 4B illustrates the object shown in FIG. 4A after motion has been removed according to a second embodiment of the present invention.
Figure 8:
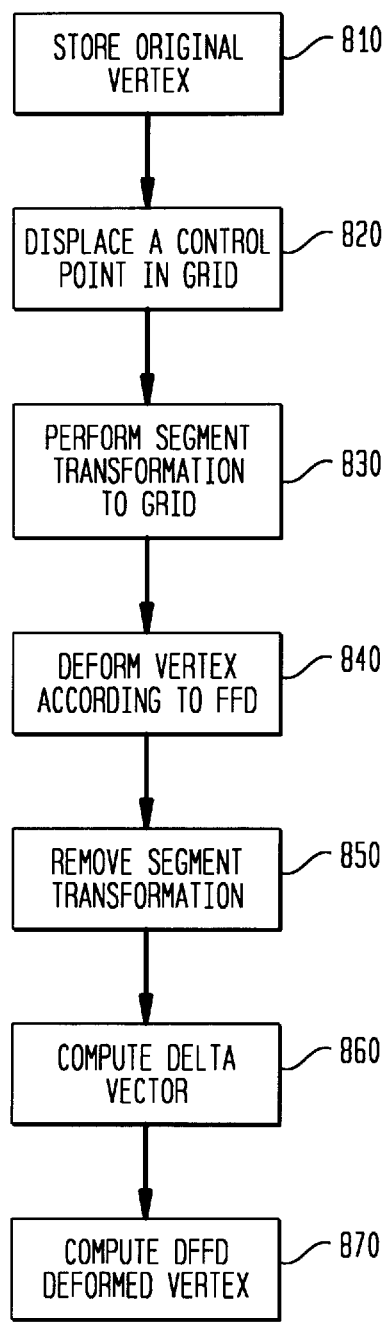
FIG. 8 illustrates a flow diagram of a second embodiment of the present invention.

A second embodiment of the present invention is now described with reference to FIG. 2, FIG. 4A–B, and FIG. 8. FIG. 2 is discussed above. FIG. 4A illustrates an object subject to a segment transformation and deformed according to a second embodiment of the present invention. FIG. 4B illustrates the deformed object after the segment transformation has been removed according to a second embodiment of the present invention. FIG. 8 illustrates the steps of a method according to the second embodiment. All three figures will be used in the following discussion.

In a step 810, an original location of vertex 160 is stored. In a step 820, a control point, for example, control point 240 is displaced. In a step 830, all control points 220, 230, 240, 250, and 260 in grid 210 of the DFFD are deformed by the segment transformation. In the preferred embodiment, control points 220, 230, 240, 250, and 260 are multiplied by a segment transformation matrix. Segment transformation matrix embodies a positional state of the segment relative to world coordinates as is well-known in the art. Specifically, grid 210 is multiplied by a segment transformation matrix. In the case of DFFDs that span joints, such as that shown in FIG. 2, additional computation is performed to bend grid 210 around elbow joint 122.

In a step 840, vertex 160 is deformed according to the conventional FFD. The conventional FFD returns a deformed vertex 460. In a step 850, the effect of the segment transformation is removed from FFD deformed vertex 465. According to the preferred embodiment, this is accomplished by multiplying FFD deformed vertex 465 by an inverse of segment transformation matrix resulting in unbent deformed vertex 466. Performing this to each vertex in skin 420 and skeleton 415 removes the effect of the segment transformation from bent arm 410 resulting in an unbent deformed arm 411. This step decouples the FFD operation from the segment transformation.

In a step 860, a delta vector 470 is computed as the difference between unbent deformed vertex 466 and vertex 160. Delta vector 470 represents an amount unbent deformed vertex 466 is displaced from vertex 160 only as a result of the FFD without the effects of the segment transformation. In this embodiment, delta vector 470 represents the result of the DFFD operation.

In a step 870, a DFFD deformed vertex 465 is computed by multiplying the sum of delta vector 470 to vertex 160 by the segment transformation matrix. As will be evident to one skilled in the art, DFFD deformed vertex 465 and FFD deformed vertex 465 are the same vertex. However, the FFD again returns the deformed vertex 465 directly while the DFFD returns delta vector 470. In this embodiment, delta vector 470 is decoupled from the segment transformation whereas FFD deformed vertex 465 is not.

Figure 5A:
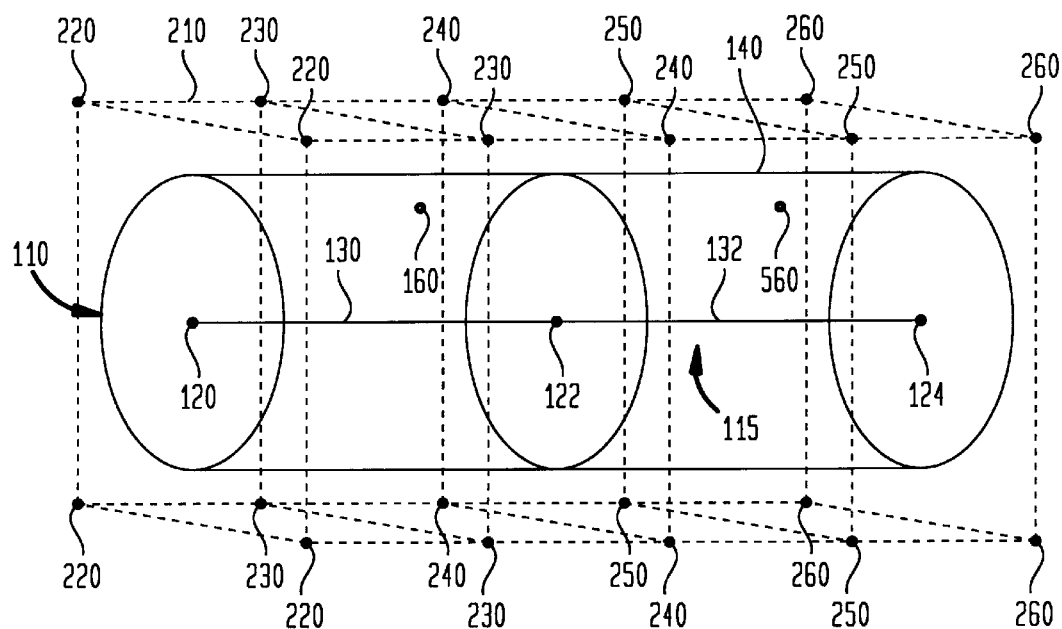
FIGS. 5A and 5B illustrate the object shown in FIG. 1 being deformed by a first DFFD overlapping a second DFFD.
Figure 5B:
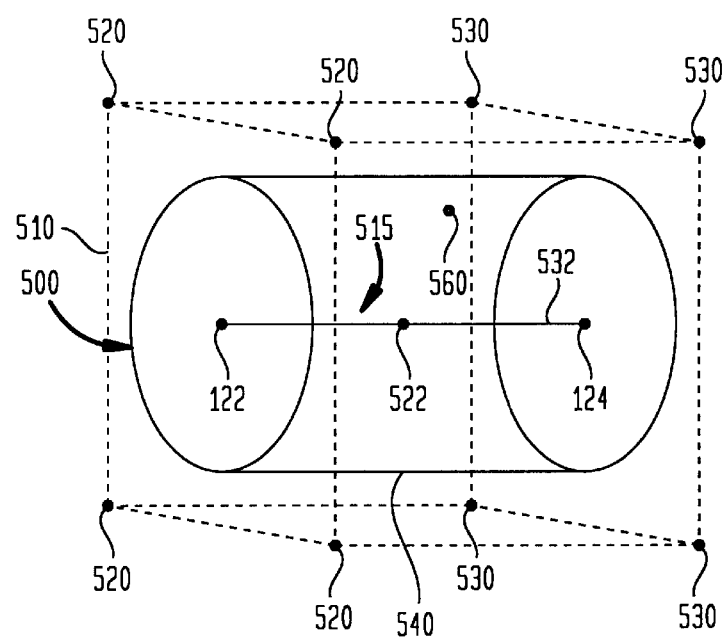
Figure 6A:
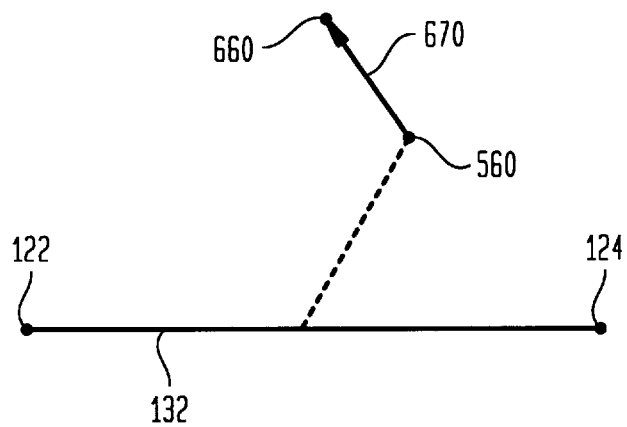
FIGS. 6A, 6B and 6C illustrate intermediate and final results of the first and second DFFD operating on a vertex of the object shown in FIGS. 5A and 5B.
Figure 6B:
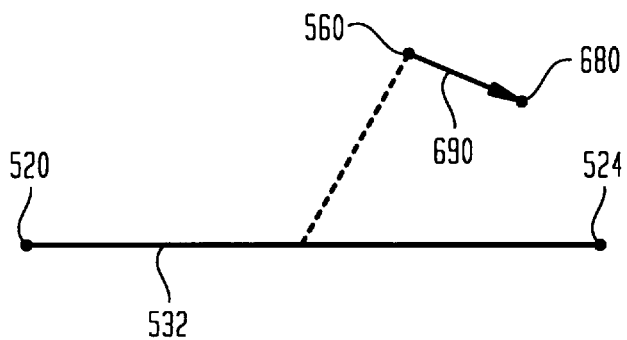
Figure 6C:
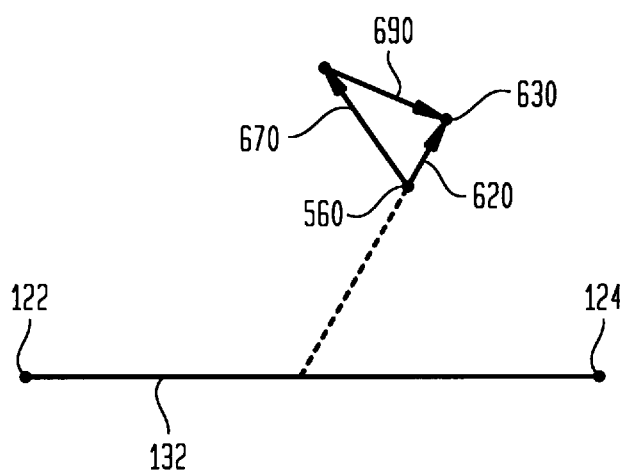
Figure 9:
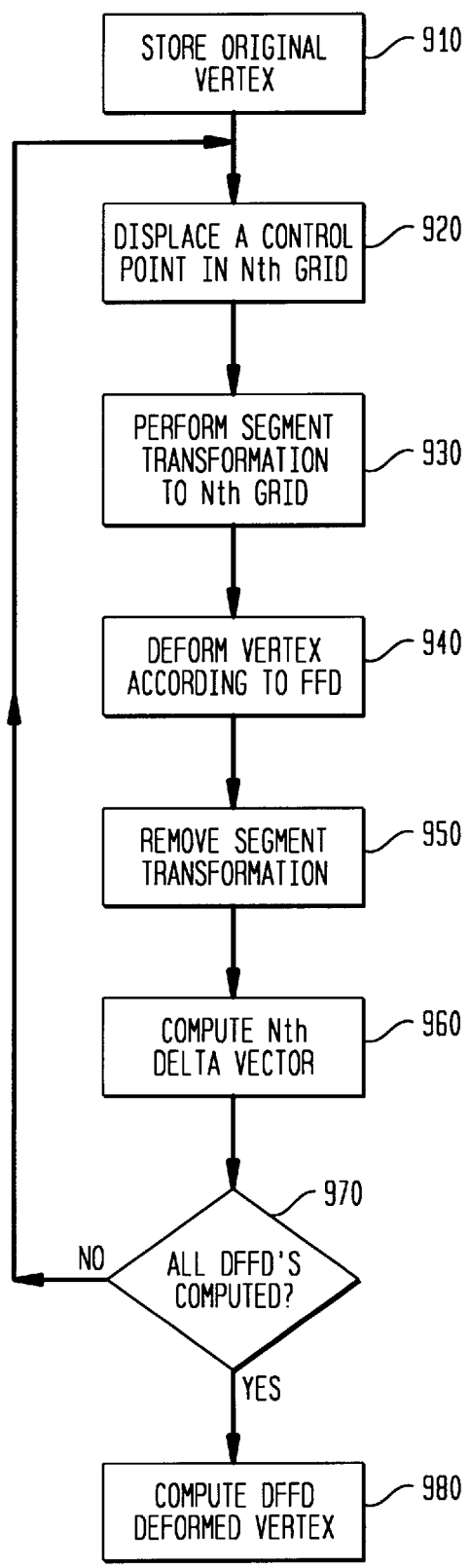
FIG. 9 illustrates a flow diagram of a third embodiment of the present invention.

A third embodiment of the present invention is described with reference to FIGS. 5A–B, FIG. 6A–C, and FIG. 9. FIG. 5 illustrates an object with overlapping sections each subject to a different segment transformation and deformation. FIG. 6A–C illustrates the incremental results of the two DFFD computations and the final resulting deformed vertex. FIG. 9 illustrates the steps of a method according to the third embodiment. All six figures will be used in the following discussion.

FIG. 5A illustrates arm 110 in grid 210 as shown in FIG. 2. FIG. 5B illustrates a forearm 500 in a grid 510. Grid 210 of FIG. 5A and grid 510 of FIG. 5B overlap each other in the region between elbow joint 122 and wrist joint 124. This overlap is desirable to properly animate a simultaneous bending and twisting motion of arm 110. This type of animation is difficult to perform using a conventional FFD.

As before, grid 510 is comprised of control points (shown as control points 520 and 530). Forearm 500 includes a skeleton 515 comprised of three joints: elbow joint 122, a mid joint 522, wrist joint 124; and two segments: upper forearm segment 530 and lower forearm segment 532. Whereas elbow joint 122 is a pivotal joint modelling bending motions, mid joint 522 is a rotational joint modelling twisting motions. Forearm 500 also includes a skin 540 which is attached to skeleton 515. Skin 540 includes an exemplary vertex 560. Vertex 560 exists in the overlapping region between elbow joint 122 and wrist joint 124. Hence, vertex 560 is also included in skin 140 in FIG. 5A.

The present invention allows a first segment transformation and FFD applied to arm 110 to be computed independently from a second segment transformation and FFD applied to forearm 500. Thus, because vertex 560 exists in the overlapping region, both segment transformations and FFDs are applied to vertex 560. The present invention also allows the independent results to be combined to determine an overall segment transformation and deformation. While described in terms of two segment transformations and deformations, the present invention is not limited to this number of segment transformations or deformations. Furthermore, the present invention is not limited to performing the same number of segment transformations as compared to deformations. In other words, additional deformations can be applied to the vertex without performing a similar number of segment transformations. Because the present invention computes an independent delta vector, any number of transformations and/or deformations can occur.

In summary, a delta vector is computed for each segment transformation and FFD as discussed above with respect to the second embodiment. The delta vectors are added together and the sum added to the original vertex to obtain an overall sum. The overall sum is multiplied by a transformation matrix to obtain an overall deformed vertex. This is discussed in further detail below.

Prior to discussing FIG. 9, a mathematic representation of a DFFD used in the third embodiment of the present invention is presented as follows:

$$\Delta V_n = DFFD(P, T^{-1}, V_n)$$

where $\Delta V_n$ is the delta vector for the $n^{th}$ vertex,
P is the set of control points of the grid,
$T^{-1}$ is the inverse of the segment transformation matrix applied to the vertex, and
$V_n$ is the $n^{th}$ vertex.

The DFFD function operates as follows:

$$X_n = FFD(P, V_n)$$
$$Y_n = X_n * T^{-1}$$
$$\Delta V_n = Y_n - X_n$$

where

-continued

> FFD is a conventional free-form deformation,
> $X_n$ is the result of the conventional FFD, and
> $Y_n$ is the result of the conventional FFD with the segment transformation removed.

After all the DFFDs are computed for the vertex, the DFFDs are combined according to the following:

where
$$V'_n = (V_n + \Sigma \Delta V_n) * T$$
T is the overall segment transformation matrix applied to $V_n$, and
$V'_n$ is the deformed vertex as a result of all the DFFDs.

The method steps of the present invention is now described. In a step 910, an original location of vertex 560 is stored. In a step 920, a control point in grid 210 of a first DFFD is displaced. In a step 930, all control points 220, 230, 240, 250, and 260 of grid 210 are transformed by a first segment transformation. In a preferred embodiment, this is accomplished by multiplying control points 220, 230, 240, 250, and 260 in grid 210 by a first segment transformation matrix. In step 940, vertex 560 is deformed according to a conventional FFD. The conventional FFD returns a first FFD deformed vertex (not shown).

In a step 950, the effect of the first segment transformation is removed from the first FFD deformed vertex. According to the preferred embodiment, this is accomplished by multiplying first FFD deformed vertex by an inverse of the first segment transformation matrix resulting in a first unbent deformed vertex 660. This step decouples the FFD operation from the segment transformation.

In a step 960, a first delta vector 670 is computed as the difference between first unbent deformed vertex 660 and vertex 560. First delta vector 670 represents an amount first unbent deformed vertex 660 is displaced from vertex 560 only as a result of the first FFD without the effects of the first segment transformation. In this embodiment, first delta vector 670 represents the result of the first DFFD operation.

In a decision step 970, it is determined whether all DFFDs have been performed on the vertex. If all DFFDs have not been computed, processing continues at step 920. In this example, all DFFDs have not been computed. Therefore, in step 920, a control point in grid 510 of a second DFFD is displaced.

In step 930, a second segment transformation is applied to control points 520 and 530 by multiplying them by a second segment transformation matrix. In this example, the second segment transformation twists skeleton 515 at mid joint 522. In step 940, vertex 560 is deformed according to the conventional FFD. The conventional FFD returns a second FFD deformed vertex (not shown).

In step 950, the effect of the second segment transformation is removed from the second FFD deformed vertex. This is accomplished by multiplying second FFD deformed vertex by an inverse of the second segment transformation matrix resulting in a second unbent deformed vertex 680. This step decouples the FFD operation from the segment transformation.

In step 960, a second delta vector 690 is computed as the difference between second unbent deformed vertex 680 and vertex 560. Second delta vector 690 represents an amount second unbent deformed vertex 680 is displaced from vertex 560 only as a result of the second FFD without the effects of the second segment transformation. In this embodiment, second delta vector 690 represents the result of the second DFFD operation.

In decision step 970, it is determined that all DFFDs have been computed for the vertex. Thus, processing continues at a step 980. In step 980, a DFFD deformed vertex is computed. First, first delta vector 670 and second delta vector 690 are added together resulting in a sum of delta vectors. Next, the sum of delta vectors is added to the original location of the vertex 560 resulting in a vertex 630. Vertex 630 is the result prior to an overall segment transformation being applied. After vertex 630 is computed, the overall segment transformation applied to vertex 560 is applied to vertex 630. In the preferred embodiment, overall segment transformation matrix is multiplied by vertex 630. The result of this operation is the DFFD deformed vertex.

Figure 10:
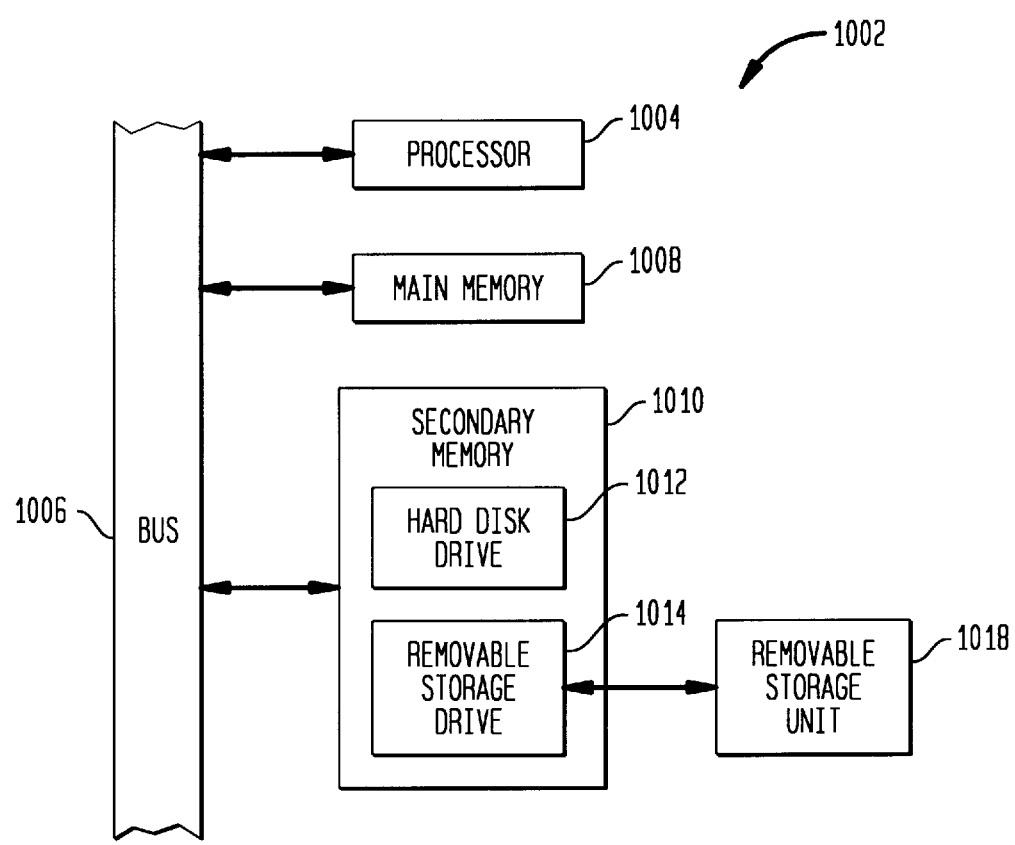
FIG. 10 illustrates an exemplary computer system upon which the present invention operates.

In one embodiment, the present invention is directed to a computer system or a graphics processing system operating as discussed herein. An exemplary computer system 1002 is shown in FIG. 10. The computer system 1002 includes one or more processors, such as processor 1004. The processor 1004 is connected to a communication bus 1006.

The computer system 1002 also includes a main memory 1008, preferably random access memory (RAM), and a secondary memory 1010. The secondary memory 1010 includes, for example, a hard disk drive 1012 and/or a removable storage drive 1014, representing a floppy disk drive, a magnetic tape drive, a compact disk drive, etc. The removable storage drive 1014 reads from and/or writes to a removable storage unit 1018 in a well known manner.

Removable storage unit 1018, also called a program storage device or a computer program product, represents a floppy disk, magnetic tape, compact disk, etc. As will be appreciated, the removable storage unit 1018 includes a computer usable storage medium having stored therein computer software and/or data.

Computer programs (also called computer control logic) are stored in main memory and/or the secondary memory 1010. Such computer programs, when executed, enable the computer system 1002 to perform the features of the present invention as discussed herein. In particular, the computer programs, when executed, enable the processor 1004 to perform the features of the present invention. Accordingly, such computer programs represent controllers of the computer system 1002.

In another embodiment, the invention is directed to a computer program product comprising a computer readable medium having control logic (computer software) stored therein. The control logic, when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

Although the invention has been described in detail in terms of specific embodiments, various modifications can be made without departing from the scope of the invention.

What is claimed is:

1. A method for deforming an object, the method comprising the steps of:
   (a) storing an original vertex located on a surface of the object;
   (b) performing a delta free-form deformation (DFFD) on said original vertex, said delta free-form deformation comprising the steps of:

(1) deforming said original vertex using a free-form deformation (FFD) and a control grid, resulting in an FFD deformed vertex;

(2) determining a delta vector, wherein said determining step includes the step of determining a difference between said FFD deformed vertex and said original vertex;

(c) adding said delta vector to said original vertex to result in a DFFD deformed vertex; and (d) displaying said DFFD deformed vertex.

2. The method of claim 1, further comprising the step of performing said step (a) through step (d) for each vertex on the surface of the object.

3. A method for deforming an object having a surface comprised of a plurality of vertices, the method comprising the steps of:

(a) performing a delta free-form deformation on one of the plurality of vertices, said delta free-form deformation comprising the steps of:

(1) transforming a grid of control points associated with said delta free-form deformation via a segment transformation, said grid enclosing said one vertex, (2) deforming said one vertex with a free-form deformation using said transformed grid resulting in a deformed vertex, (3) untransforming said deformed vertex via an inverse of said segment transformation resulting in a untransformed deformed vertex, and (4) determining a delta vector based on said untransformed deformed vertex and said one vertex, wherein said step of determining a delta vector includes the step of determining a difference between said untransformed deformed vertex and said one vertex;

(b) determining a DFFD deformed vertex based on said delta vector and said one vertex; and (c) displaying said DFFD deformed vertex.

4. The method of claim 3, wherein said step (b) of determining a DFFD deformed vertex further comprises the steps of:

adding said delta vector to said one vertex resulting in an intermediate vertex; and transforming said intermediate vertex via said segment transformation resulting in said DFFD deformed vertex.

5. The method of claim 4, further comprising the step of performing said step (a) through step (c) for each of said plurality of vertices.

6. The method of claim 3, wherein said step (1) of transforming comprises the step of multiplying by a segment transformation matrix.

7. The method of claim 6, wherein said step (3) of untransforming comprises the step of multiplying by an inverse of said segment transformation matrix.

8. The method of claim 4, wherein said step of transforming said intermediate vertex comprises the step of multiplying by a segment transformation matrix.

9. The method of claim 3, further comprising before said step (b) of determining, the step of:

performing a second delta free-form deformation on said one vertex using a second segment transformation and a second free-form deformation resulting in a second delta vector.

10. The method of claim 9, wherein said step (b) of determining a DFFD deformed vertex comprises the steps of:

adding said delta vector and said second delta vector to said one vertex resulting in an intermediate vertex; and transforming said intermediate vertex via said segment transformation and said second segment transformation resulting in a DFFD deformed vertex.

11. A method for performing a delta-free form deformation on a vertex located on a surface of an object, the method comprising the steps of:

(1) transforming a grid of control points associated with said delta free-form deformation via a segment transformation, said grid enclosing the vertex;

(2) deforming the vertex with a free-form deformation using said transformed grid resulting in a deformed vertex;

(3) untransforming said deformed vertex via an inverse of said segment transformation resulting in a untransformed deformed vertex;

(4) determining a delta vector based on said untransformed deformed vertex and the vertex; wherein said determining step includes a step of determining a difference between said untransformed deformed vertex and the vertex;

(5) determining a DFFD deformed vertex based on said delta vector and the vertex; and (6) displaying said DFFD deformed vertex.

12. The method of claim 11, wherein step (5) of determining a DFFD deformed vertex further comprises the steps of:

determining an intermediate vertex based on the vertex and said delta vector; and transforming said intermediate vertex via said segment transformation resulting in a DFFD deformed vertex.

13. The method of claim 11, wherein said step (1) of transforming comprises the step of multiplying by a segment transformation matrix.

14. The method of claim 13, wherein said step (3) of untransforming comprises the step of multiplying by an inverse of said segment transformation matrix.

15. The method of claim 12, wherein said step of transforming said intermediate vertex comprises the step of multiplying by a segment transformation matrix.

16. The method of claim 11, wherein said step of (4) of determining said delta vector comprises the step of subtracting the vertex from said untransformed deformed vertex.

17. The method of claim 12, wherein said step of determining said intermediate vertex comprises the step of adding said delta vector to the vertex.

18. The method of claim 1, further comprising before said step (c) of adding, the step of:

performing a second delta free-form deformation on said original vertex using a second free-form deformation resulting in a second delta vector.

19. The method of claim 18, wherein said step (c) of adding comprises the step of:

(c) adding said delta vector and said second delta vector to said original vertex resulting in said DFFD deformed vertex.

20. A method for deforming an animated object having a skeleton and a skin, the skin having a plurality of vertices, the method comprising the steps of:

(a) determining a segment transformation of the skeleton, said segment transformation operating to position the skeleton;

(b) performing a delta free-form deformation on one of the plurality of vertices, said delta free-form deformation comprising the steps of:

(1) transforming a grid of control points associated with said delta free-form deformation via said segment transformation, said grid enclosing said one vertex, (2) deforming said one vertex with a free-form deformation using said transformed grid resulting in a deformed vertex, (3) untransforming said deformed vertex via an inverse of said segment transformation resulting in a untransformed deformed vertex, and (4) determining a delta vector based on said untransformed deformed vertex and said one vertex, wherein said step of determining a delta vector includes a step of determining a difference between said untransformed deformed vertex and said one vertex;

(c) determining a DFFD deformed vertex based on said one vertex and said delta vector; and (d) displaying said DFFD deformed vertex.

21. The method of claim 20, further comprising before said step (c) of determining, the step of:

performing a second delta free-form deformation on said one vertex using a second segment transformation and a second free-form deformation resulting in a second delta vector.

22. The method of claim 20, wherein said step (c) of determining comprises the steps of:

adding said delta vector and said second delta vector to said one vertex resulting in an intermediate vertex; and transforming said intermediate vertex via said segment transformation and said second segment transformation resulting in a DFFD deformed vertex.

23. A computer program product for use with a computer comprising a computer useable medium having computer program logic for deforming an object, said computer program logic comprising:

computer readable program code means for causing the computer to store an original vertex located on a surface of the object;

computer readable program code means for causing the computer to perform a delta free-form deformation (DFFD) on said original vertex comprising:

computer readable program code means for causing the computer to deform said original vertex using a free-form deformation (FFD) and a control grid, resulting in an FFD deformed vertex;

computer readable program code means for causing the computer to determine a delta vector, wherein said computer readable program code means for determining a delta vector includes computer readable program code means for determining a difference between said FFD deformed vertex and said original vertex; and computer readable program code means for causing the computer to add said delta vector to said original vertex to result in a DFFD deformed vertex program code means or causing the computer to display said DFFD deformed surface.

24. The computer program product of claim 23, further comprising computer readable program code means for causing the computer to perform a second delta free-form deformation on said original vertex using a second free-form deformation resulting in a second delta vector.

25. The computer program product of claim 24, wherein said computer readable program code means for adding comprises computer readable program code means for causing the computer to add said delta vector and said second delta vector to said original vertex resulting in said DFFD deformed vertex.

26. A computer program product for use with a computer comprising a computer useable medium having computer program logic for performing a delta-free form deformation on an original vertex located on a surface of an object, said program logic comprising:

computer readable program code means for causing the computer to transform a control grid associated with said delta free-form deformation via a segment transformation;

computer readable program code means for causing the computer to deform the original vertex with a free-form deformation using said transformed grid resulting in a deformed vertex;

computer readable program code means for causing the computer to untransform said deformed vertex via an inverse of said segment transformation resulting in a untransformed deformed vertex;

computer readable program code means for causing the computer to determine a delta vector based on said untransformed deformed vertex and the original vertex, wherein said computer readable program code means for determining a delta vector includes computer readable program code means for determining a difference between said untransformed deformed vertex and the original vertex; and computer readable program code means for causing the computer to determine a DFFD deformed vertex based on said delta vector and the original vertex program code means for causing the computer to display said DFFD deformed surface.

27. The computer program product of claim 26, wherein computer readable program code means for determining a DFFD deformed vector, further comprises:

computer readable program code means for causing the computer to determine an intermediate vertex based on the original vertex and said delta vector; and computer readable program code means for causing the computer to transform said intermediate vertex via said segment transformation resulting in a DFFD deformed vertex.

28. The computer program product of claim 26, wherein said computer readable program code means for transforming a control grid comprises computer readable program code means for causing the computer to multiply by a segment transformation matrix.

29. The computer program product of claim 26, wherein said computer readable program code means for causing the computer to untransform said deformed vertex comprises computer readable program code means for multiplying by an inverse of a segment transformation matrix.

* * * * *

UNITED STATES PATENT AND TRADEMARK OFFICE
CERTIFICATE OF CORRECTION

PATENT NO. : 5,818,452
DATED : October 6, 1998
INVENTOR(S) : Atkinson, et al.

It is certified that error appears in the above-identified patent and that said Letters Patent is hereby corrected as shown below:

Column 11, line 46, after ";" insert --and--.

Column 11, line 53, after ";" delete --and--.

Column 11, line 56, after "vertex" insert --; and computer readable--.

Column 11, line 58, delete "surface" and insert --vertex--.

Column 12, line 34, after ";" delete --and--.

Column 12, line 37, after "vertex" insert --; and computer readable--.

Column 12, line 39, delete "surface" and insert --vertex--.

Signed and Sealed this

Sixteenth Day of March, 1999

*Attest:*

Q. TODD DICKINSON

*Attesting Officer*  *Acting Commissioner of Patents and Trademarks*